(12) United States Patent
Krenz (10) Patent No.: US 10,370,171 B1
(45) Date of Patent: Aug. 6, 2019

(54) INSULATED LIQUID STORAGE CONTAINER

(71) Applicant: Taylor Krenz, Tempe, AZ (US)

(72) Inventor: Taylor Krenz, Tempe, AZ (US)

( * ) Notice: Subject to any disclaimer, the term of this patent is extended or adjusted under 35 U.S.C. 154(b) by 0 days.

(21) Appl. No.: 15/959,089

(22) Filed: Apr. 20, 2018

(51) Int. Cl.
| | |
|---|---|
| *B65D 81/38* | (2006.01) |
| *G01F 23/00* | (2006.01) |
| *B65D 47/12* | (2006.01) |
| *B65D 51/18* | (2006.01) |
| *B65D 43/02* | (2006.01) |

(52) U.S. Cl.
CPC ...... *B65D 81/3841* (2013.01); *B65D 43/0227* (2013.01); *B65D 47/122* (2013.01); *B65D 51/18* (2013.01); *G01F 23/0069* (2013.01)

(58) Field of Classification Search
CPC ............ B65D 81/3841; B65D 43/0227; B65D 47/122; B65D 51/18; G01F 23/0069
See application file for complete search history.

(56) References Cited

U.S. PATENT DOCUMENTS

| | | | | |
|---|---|---|---|---|
| 1,755,333 A | * | 4/1930 | Myers | A47J 31/50 137/275 |
| 1,803,639 A | * | 5/1931 | Payson | F25D 3/122 215/12.1 |
| 3,048,294 A | * | 8/1962 | Osborn | A47J 41/0077 215/12.2 |
| 3,161,031 A | * | 12/1964 | Flannery | F25D 3/08 215/395 |
| 4,138,027 A | * | 2/1979 | Frye | A47J 41/028 215/12.2 |
| 5,769,262 A | * | 6/1998 | Yamada | A47G 19/2288 215/13.1 |
| 5,913,445 A | * | 6/1999 | Fujii | A47J 41/0077 215/13.1 |
| 6,915,917 B2 | * | 7/2005 | Watanabe | A47J 41/024 215/12.1 |
| 7,571,830 B2 | * | 8/2009 | Lin | A47J 41/0016 206/217 |
| 9,181,015 B2 | * | 11/2015 | Booska | B65D 81/3484 |
| 9,567,150 B2 | * | 2/2017 | Lachance | B65D 81/382 |
| 2006/0008622 A1 | * | 1/2006 | Cowelchuk | B29C 70/086 428/156 |
| 2017/0293058 A1 | * | 10/2017 | Lee | C09K 19/02 |
| 2018/0116433 A1 | * | 5/2018 | Smaldone | A47G 19/2288 |

* cited by examiner

*Primary Examiner* — Kareen K Thomas
(74) *Attorney, Agent, or Firm* — Lewis Roca Rothgerber Christie LLP (57) ABSTRACT

A liquid storage container that includes a lid and a body. The body defines a storage cavity. The body has a double-walled vacuum insulated layer that defining the storage cavity. A membrane is formed around the double-walled vacuum insulated layer and a coating is formed on the outside of the membrane.

19 Claims, 8 Drawing Sheets

INSULATED LIQUID STORAGE CONTAINER

BACKGROUND

1. Field

Some embodiments of the present disclosure relate generally to insulated storage containers.

2. Description of the Related Art

Reusable water bottles are often constructed out of glass, plastic, or metal. Each material provides various advantages related to insulation and durability. Glass water bottles don't provide much insulation and are susceptible to breaking. Plastic water bottles are more durable than glass water bottles, but can still be scratched or shattered. Metal water bottles are the most durable, but a single-walled design provides for very little insulation. Double-walled metal water bottles utilize vacuum insulation to provide superior thermal performance. Metal water bottles, however, are susceptible to scratching and denting. A new design with improved thermal performance and durability is desired.

The above information is only for enhancement of understanding of the background of embodiments of the present disclosure, and therefore may contain information that does not form the prior art.

SUMMARY

Some embodiments of the present disclosure provide a system and method of manufacture for a liquid storage container. In various embodiments, the liquid storage container includes a lid removably coupled to a body. In various embodiments, the body defines a storage cavity. In various embodiments the body includes a double-walled vacuum insulated layer defining the storage cavity. In various embodiments, the body also includes a membrane formed on an outside of the double-walled vacuum insulated layer. In various embodiments, a coating is formed on the membrane.

In various embodiments, the membrane is a polycarbonate.

In various embodiments, the membrane is at least one of a polypropylene (PP), polystyrene (PS), high impact polystyrene (HIPS), acrylonitrile butadiene styrene (ABS), polyethylene terephthalate (PET or PETE), polyester (PES), polyamides (PA) (Nylons), poly (vinyl chloride) (PVC), polyurethanes (PU), polyethylene (PE), polylactic acid (PLA), perylic (PMMA), or acetal (Polyoxymethylene, POM).

In various embodiments, the coating is an aromatic polyurethane-based coating.

In various embodiments, the coating is at least one of a hardide-based coating, a thermoplastic elastomer (TPE)-based coating, a silicone-based coating, a rubber-based coating, a cerakote-based coating, or a D3O-based coating.

In various embodiments, the lid is a two-part lid having an upper portion removably connected to a lower portion.

In various embodiments, the upper portion is removably connected to a lower portion by a half-turn of the upper portion relative to the lower portion.

In various embodiments, the lower portion includes a cavity having an inlet and a spout.

In various embodiments, the inlet defines a half-circle shaped passage between the storage cavity and the cavity. In various embodiments, the cavity is defined by an upper cavity surface that extends from a flat side of the inlet to a spout. In various embodiments, the upper cavity surface has a parabolic shape that curves around a center of the cavity. In various embodiments, a lower cavity surface that extends from the curved side of the spout, wherein the lower cavity surface comprises a multi-curved shape having a curved shape with a decreasing slope and then an increasing slope until the slope becomes substantially vertical near the spout In various embodiments, the lid includes a liquid measuring circuit.

In various embodiments, the liquid measuring circuit comprises an optical sensor configured to measure a distance from a bottom of the lid to a surface of a liquid in the storage cavity.

In various embodiments, a method of manufacturing a liquid storage container from a double-walled vacuum insulated layer includes pressing a membrane over the outside of the double-walled vacuum insulated layer using a hydraulic press, spraying a first coat of a coating at a first distance on the membrane, and spraying a second coat of the coating at a second distance on the first coat.

In various embodiments, the membrane is a polycarbonate.

In various embodiments, the coating is an aromatic polyurethane-based coating.

In various embodiments, the second distance is approximately the same as the first distance.

In various embodiments, the second distance is approximately double the first distance.

In various embodiments, the first distance is approximately 2 feet and the second distance is approximately 4 feet.

In various embodiments, the first distance is approximately 2 feet and the second distance is approximately 2 feet.

In various embodiments, a liquid storage container includes a two-part lid, having an upper portion that is removably coupled to a lower portion, and the lower portion is removably coupled to a body. In various embodiments the body includes a storage cavity defined by a double-walled vacuum insulated layer. In various embodiments the body includes a polycarbonate membrane formed on an outside of the double-walled vacuum insulated layer. In various embodiments the body includes an aromatic polyurethane-based coating formed on an outside of the membrane.

In various embodiments, the lower portion comprises a liquid measuring circuit.

BRIEF DESCRIPTION OF THE DRAWINGS

Some embodiments can be understood in more detail from the following description taken in conjunction with the accompanying drawings, in which.

DETAILED DESCRIPTION

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include an insulated liquid storage container. In various embodiments, the storage container may be used as an improved water bottle that exhibits increased durability and thermal insulation when compared to previous water bottles. For example, the improved water bottle includes a plurality of layers, that when combined, increase both the dent resistance and the scratch resistance of the water bottle. In various embodiments, the water bottle includes a double-walled vacuum insulated metal core. In various embodiments, the metal core is coated with a membrane layer that is configured to prevent any dents from forming in the water bottle. In various embodiments, an outer coating is provided to add additional insulation, prevent scratching, and provide a desired texture.

Figure 1:
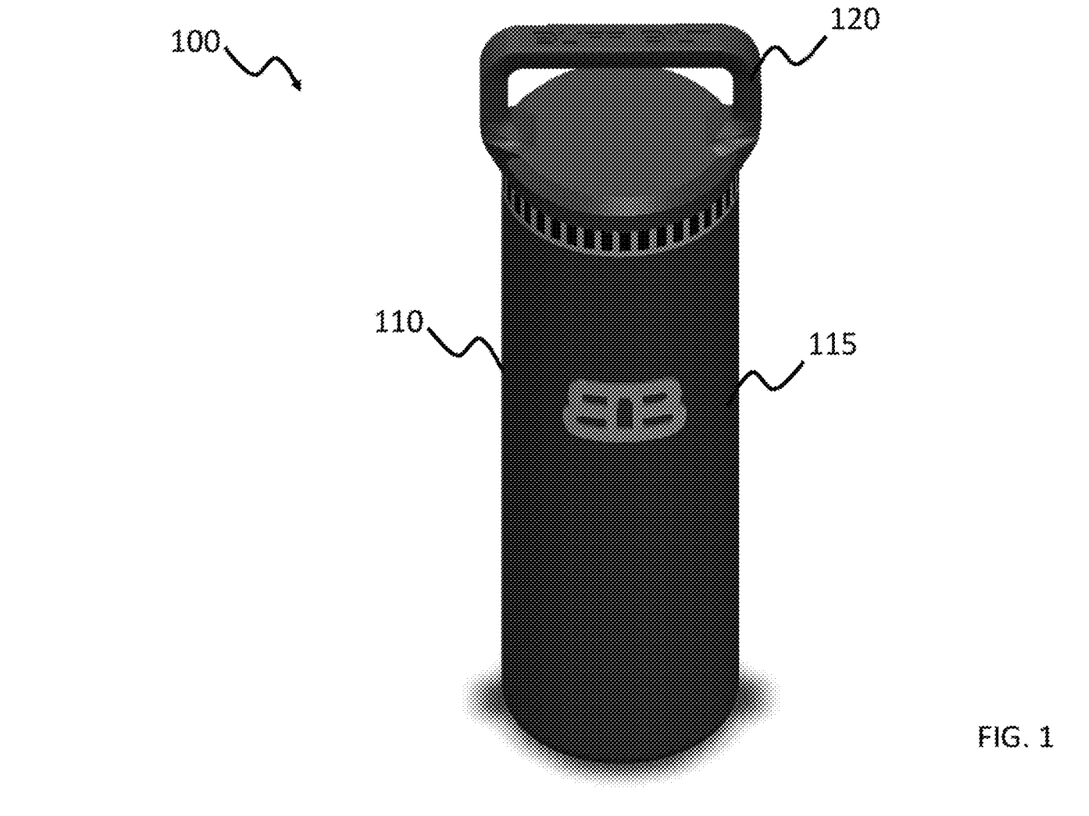
FIG. 1 depicts an example insulated liquid storage container according to various embodiments of the present invention.

FIG. 1 depicts an example insulated liquid storage container according to various embodiments of the present invention.

Referring to FIG. 1, the in various embodiments the insulated liquid storage container 100 has a body 110 and a two-part lid 120. In various embodiments, the body 110 includes a multi-layered construction configured for improved insulation as well as improved durability. In various embodiments, the body 110 defines an insulated cavity and an outer surface 115. In various embodiments the outer surface 115 is an outer coating configured to be insulative, scratch resistant, and have a desired texture. The outer surface 115 may have a smooth texture or may include rougher texture configured to improve a user's grip when handling the container 100.

In various embodiments, thermal performance of the liquid storage container may be further improved by way of the two-part lid 120 positioned at the top of the body 110. Removing the lid of a water bottle allows relatively warm outside air (or relatively cool outside air) to enter the storage container 100 each time a user removes the lid. In various embodiments, the two-part lid 120 is configured to provide for a controllable flow of liquid while also reducing the air exchange between the outside and the inside of the container when the user wishes to dispense the contents of the container (e.g. take a drink). The two-part lid 120 will be discussed in detail below with reference to FIGS. 3A and 3B.

Figure 2:
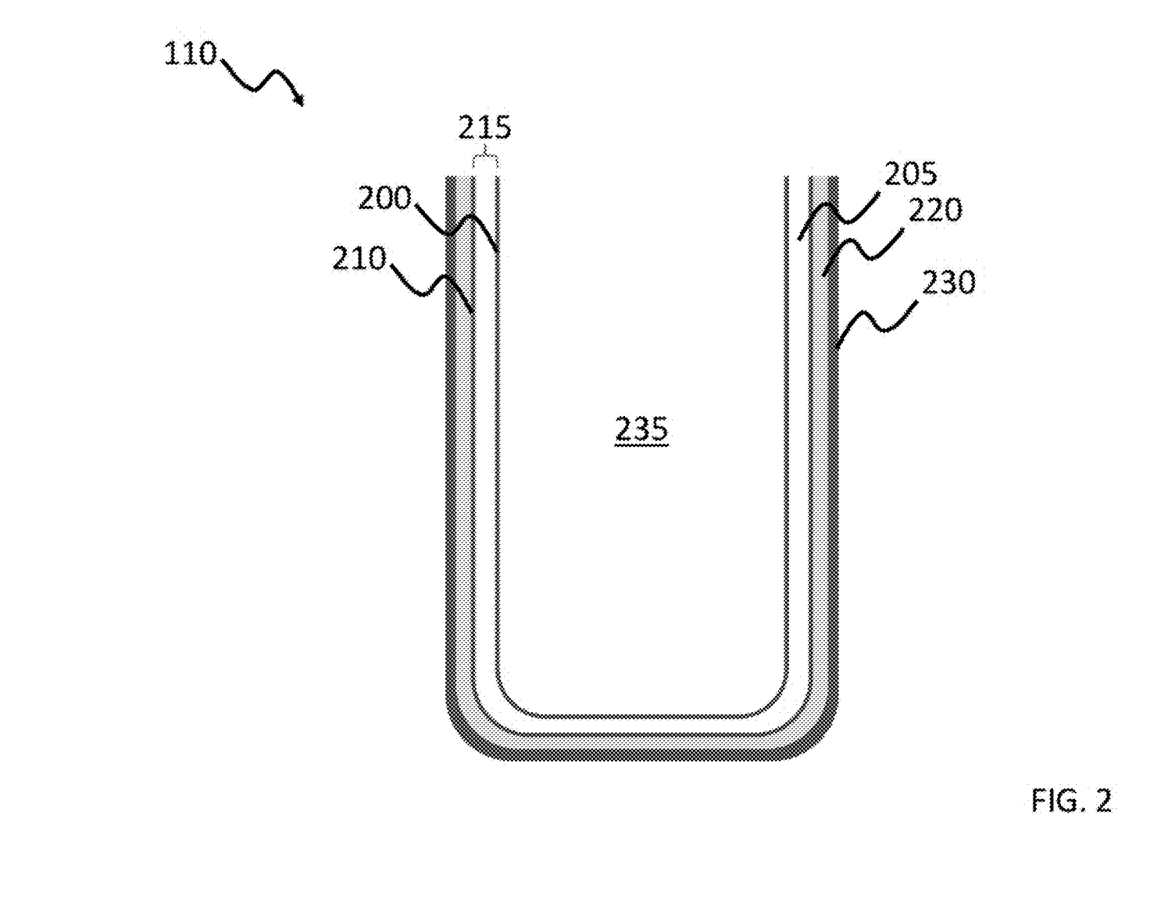
FIG. 2 depicts an example cut through view depicting the various layers of the body 110 according to various embodiments of the present invention.

FIG. 2 depicts an example cut through view depicting the various layers of the body 110 according to various embodiments of the present invention.

Referring to FIG. 2, in various embodiments, the body 110 may be constructed with a plurality of layers made from several materials. It should be noted that the illustrated thicknesses are for ease of representation and may not correspond to the actual sizes of the layers. In various embodiments an inner metal layer 200 may define the inner surface of the body 110 that forms the insulated storage cavity 235 and come into contact with any liquid stored in the bottle. In various embodiments, the inner metal layer 200 may, in conjunction with the outer metal layer 210 also define a mouth portion of the bottle and include threads for receiving and securing the two-part lid. In various embodiments, an outer metal layer 210 may indirectly define the outside shape of the bottle. In various embodiments, the inner metal layer 200 and the outer metal layer 210 may be constructed using any food grade metal. For example, the in various embodiments, the inner and outer metal layers 200, 210 may be 18/8 stainless steel. In other embodiments, the inner and outer metal layers 200, 210 may be constructed out of different food grade metals or plastics.

In various embodiments, the inner metal layer 200 and the outer metal layer 210 may be formed together to create a double-walled container having a vacuum layer 205 between the metal layers. For example, the inner metal layer 200 and the outer metal layer 210 may be separated by a gap and joined near the neck of the bottle. Thus, the inner and outer metal layers 200, 210 with the vacuum layer 205 may form a double-walled vacuum insulated layer 215.

In various embodiments, a membrane layer 220 may be configured to provide impact protection for the double-walled vacuum insulated layer 215. Thus, in various embodiments, the membrane layer 220 may be formed around the outer metal layer 210, effectively encasing the double-walled vacuum insulated layer 215 on the bottom and sides. For example, in various embodiments, the membrane layer 220 may include a high performance plastic that encases the double-walled vacuum insulated layer 215. For example, in various embodiments, the membrane layer 220 may be constructed using polypropylene (PP), polystyrene (PS), high impact polystyrene (HIPS), acrylonitrile butadiene styrene (ABS), polyethylene terephthalate (PET or PETE), polyester (PES), polyamides (PA) (Nylons), poly (vinyl chloride) (PVC), polyurethanes (PU), polycarbonate (PC), polyethylene (PE), polylactic acid (PLA), perylic (PMMA), acetal (Polyoxymethlene, POM), or any other durable plastic. For example, in various embodiments, the membrane 220 may be constructed using polycarbonate that joined to the double-walled vacuum insulated layer 215 by a hydraulic press.

In various embodiments, an outer coating 230 provides added insulation, further durability, and texture. In various embodiments, the outer coating 230 may be a liquid that is applied to the membrane 220. In various embodiments, the outer coating 230 may be a multi-component spray. For example, the outer coating 230 may be an aromatic polyurethane, a hardide coating, a thermoplastic elastomer (TPE), a silicone, an unsaturated or saturated rubber, a cerakote, or a D3O-based coating. In various embodiments, the outer coating 230 is a high performance aromatic polyurea/polyurethane hybrid spray elastomer.

In various embodiments, the outer coating may be sprayed onto the membrane 220 as one or more layers applied at the same or different distances. For example, in various embodiments, the outer coating 230 may be applied in two layers. A first layer may be sprayed at a first distance and a second layer may be sprayed at a second distance. The distance of each applied layer of the outer coating 230 may be selected to achieve a desired finish. For example, the outer coating 230 may be initially sprayed with a first layer at a distance of approximately 2 feet. In various embodiments, the second layer of the outer coating 230 may be sprayed at a distance of approximately 2 feet, resulting in a relatively smooth finish. In other embodiments, the second layer of the outer coat 230 may be sprayed at a distance of approximately 4 feet, resulting in a textured finish that may provide additional friction for gripping the bottle.

Figure 3A:
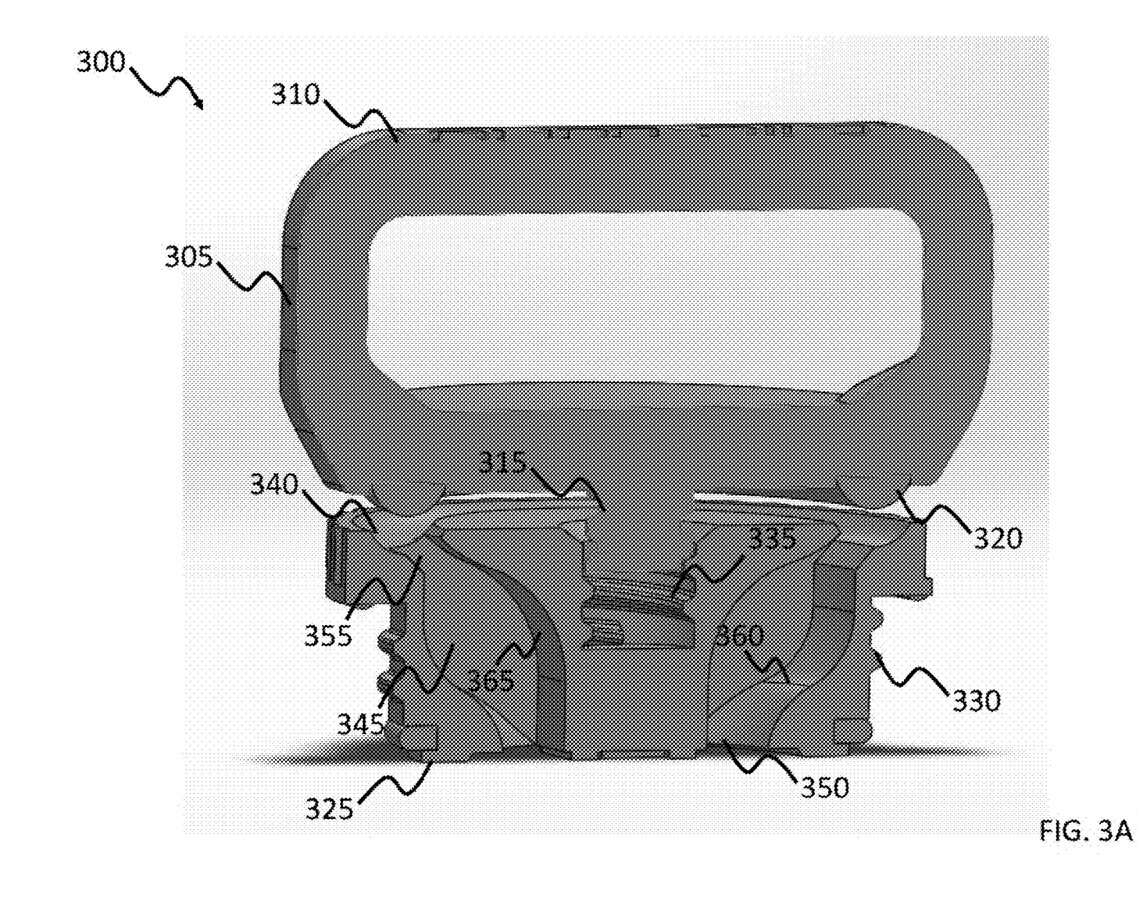
FIGS. 3A and 3B depict a cutoff view of the two-part lid of the liquid storage container from different perspectives in accordance with various embodiments of the invention.
Figure 3B:
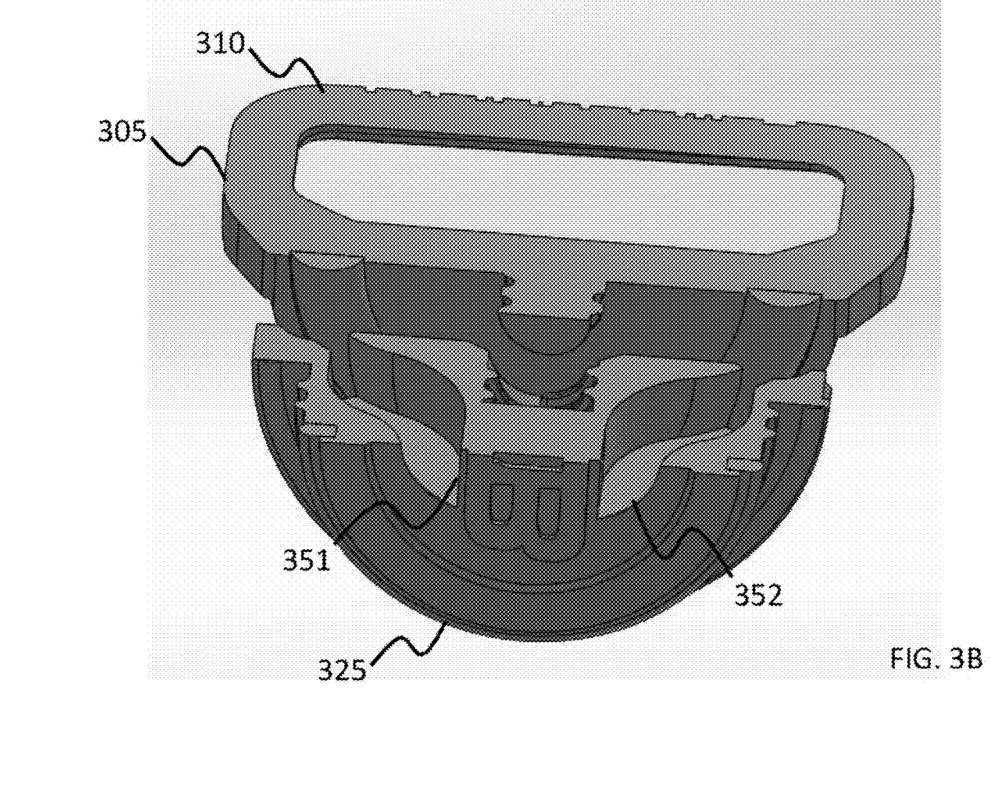
Figure 3C:
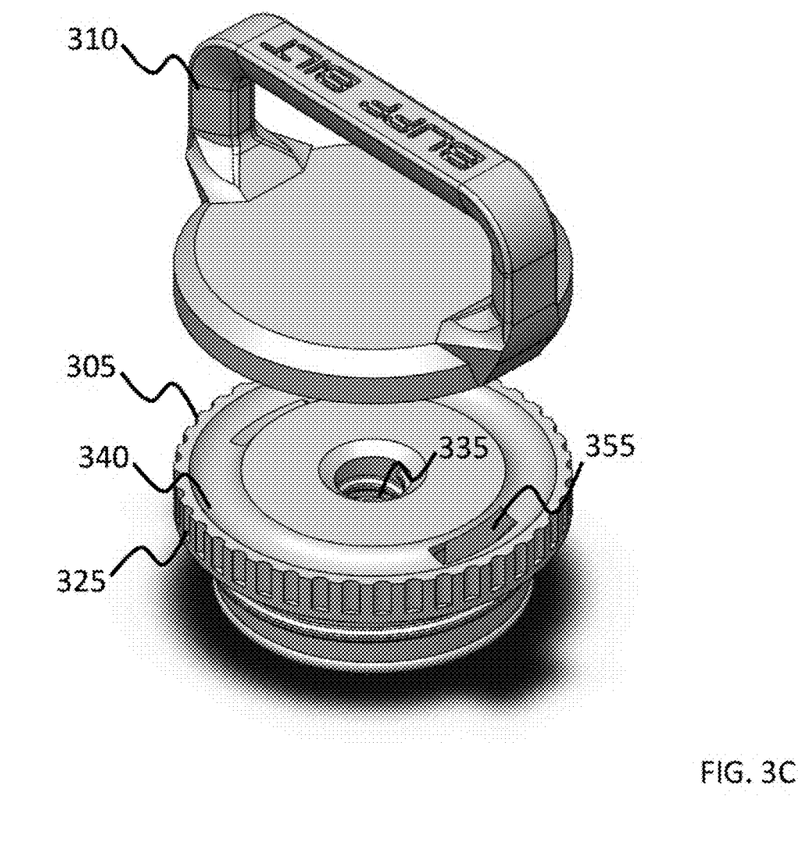
FIGS. 3C and 3D depict perspective views of the two-part lid of the liquid storage container in accordance with various embodiments of the invention.
Figure 3D:
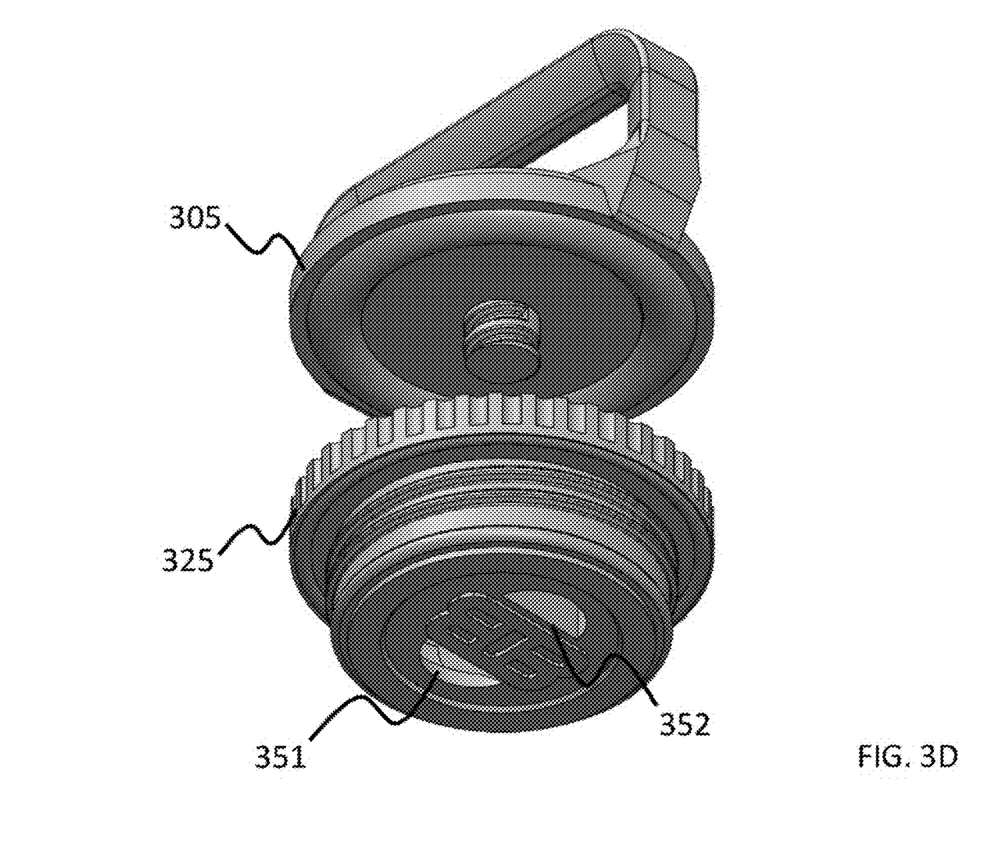

FIGS. 3A and 3B depict a cutoff view of the two-part lid of the liquid storage container from different perspectives in accordance with various embodiments of the invention. FIGS. 3C and 3D depict perspective views of the two-part lid of the liquid storage container in accordance with various embodiments of the invention.

Referring to FIGS. 3A-D, the two-part lid 300 is configured to allow for access to the contents of the container without fully opening the lid. In various embodiments, the two-part container includes an upper portion 305 and a lower portion 325. In various embodiments, the two-part lid 300 is configured to provide a watertight seal for the insulated container and also allow for the upper portion 305 to be removably coupled to the lower portion 325 to allow access to the container contents. For example, the lower portion 325 may be configured to allow for the liquid to be dispersed from the container at a regulated flow rate while also reducing the air exchange between the inside and outside of the container. Thus, the overall insulating capabilities of the container may be improved while other benefits are conferred. For example, the full lid is able to be removed by the user so that ice, for example, may be added by the user. When drinking from the container, the upper section may be removed and the inner liquid may be distributed without the ice being removed.

In various embodiments, the two-part lid 300 includes an upper portion 305 and a lower portion 325. The upper portion 305 may include a handle 310 for easily carrying the container. The handle 310 may also provide leverage for twisting the upper portion 305 to remove it from the lower portion 325. For example, in various embodiments, the upper portion 305 includes upper portion threads 315 for removably coupling the upper portion 305 to the lower portion 325. For example, in various embodiments, the upper portion threads 315 may be external threads configured to couple to the internal threads 335 of the lower portion. In various embodiments, the upper portion threads 315 and the internal threads 335 may be configured to allow for the upper portion 305 to be removed from the lower portion 325 with a half turn of the upper portion 305.

In various embodiments, the upper portion also includes a dam 320 and the lower portion includes a dam receiver 340 that have complimentary shapes that when press fit, produce a water tight seal. For example, the damn 320 may have a semicircular shape and the dam receiver 340 includes a complimentary semi-circle curve that is substantially filled by the dam when the upper portion 305 is tightened onto the lower portion 325.

In various embodiments, the lower portion 325 is configured to be removably coupled to the insulated body. For example, in various embodiments the lower portion 325 includes lower portion external threads 330. The container body may have corresponding internal threads that allow for the lower portion 325 (and thereby the entire two-part lid 300) to be removably coupled to the insulated body.

In various embodiments, the lower portion 325 includes two cavities 345 configured to provide a controllable high flow of liquid. In various embodiments, each cavity 345 allows for liquid to be passed through the lid or act as a vent. For example, the cavities may be positioned opposite of each other. In various embodiments, the cavity includes an inlet 350 from the inside of the container and a spout 355 from the lower portion 325.

In various embodiments, the inlets 350 may be spaced apart around the center of the lower portion 325 (e.g with the center in-between). In various embodiments, each inlet may have a semicircular-shaped end 352 with a flat side 351 (e.g. a half circle with a flat side). The flat sides of each inlet 350 may be positioned closest to the center of the lower portion 325 and be substantially parallel with each other.

In various embodiments, the proportions of the cavity 345 are defined by the inlet 350, the spout 355, an upper cavity surface 365, and a lower cavity surface 360. In various embodiments, the upper cavity surface 365 extends from the flat side of the inlet and upwards to the spout 355. In various embodiments, the upper cavity surface 365 is configured to divert liquid into the spout 355 and has a generally curved or parabolic shape with a width equal to the flat side. In various embodiments, the lower cavity surface extends from the semicircular portion of the inlet as a plane having a curved shape that extends upwards with a decreasing slope and then extends upward with an increasing slope until the slope becomes substantially vertical near the spout 355.

Figure 4:
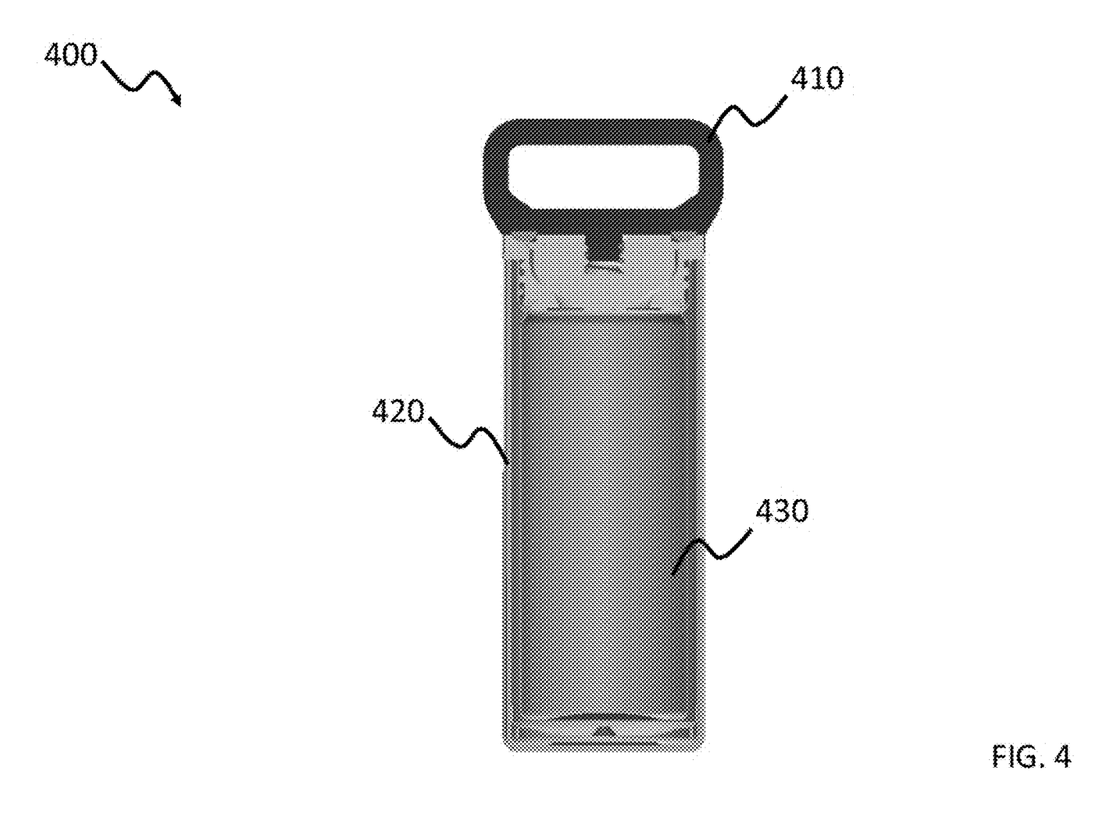
FIG. 4 depicts a cutoff view of the storage container in accordance with various embodiments of the invention.

FIG. 4 depicts a cutoff view of the storage container in accordance with various embodiments of the invention.

Referring to FIG. 4, the various parts and layers of the storage container 400 that were described above are depicted. For example, the storage container 400 includes a two part lid 410 that is removably coupled to an insulated body 420. In various embodiments, the lid 410 and body 420 are coupled using threads, but it should be understood that any other fasteners may be substituted that allow for the lid to be at least removed from the body and allow for a watertight seal to the body 420. The insulated body defines an insulated storage cavity 430 for storing liquids. The body includes FIG. 5 depicts a block diagram of a hydration tracking circuit in accordance with various embodiments of the invention.

Figure 5:
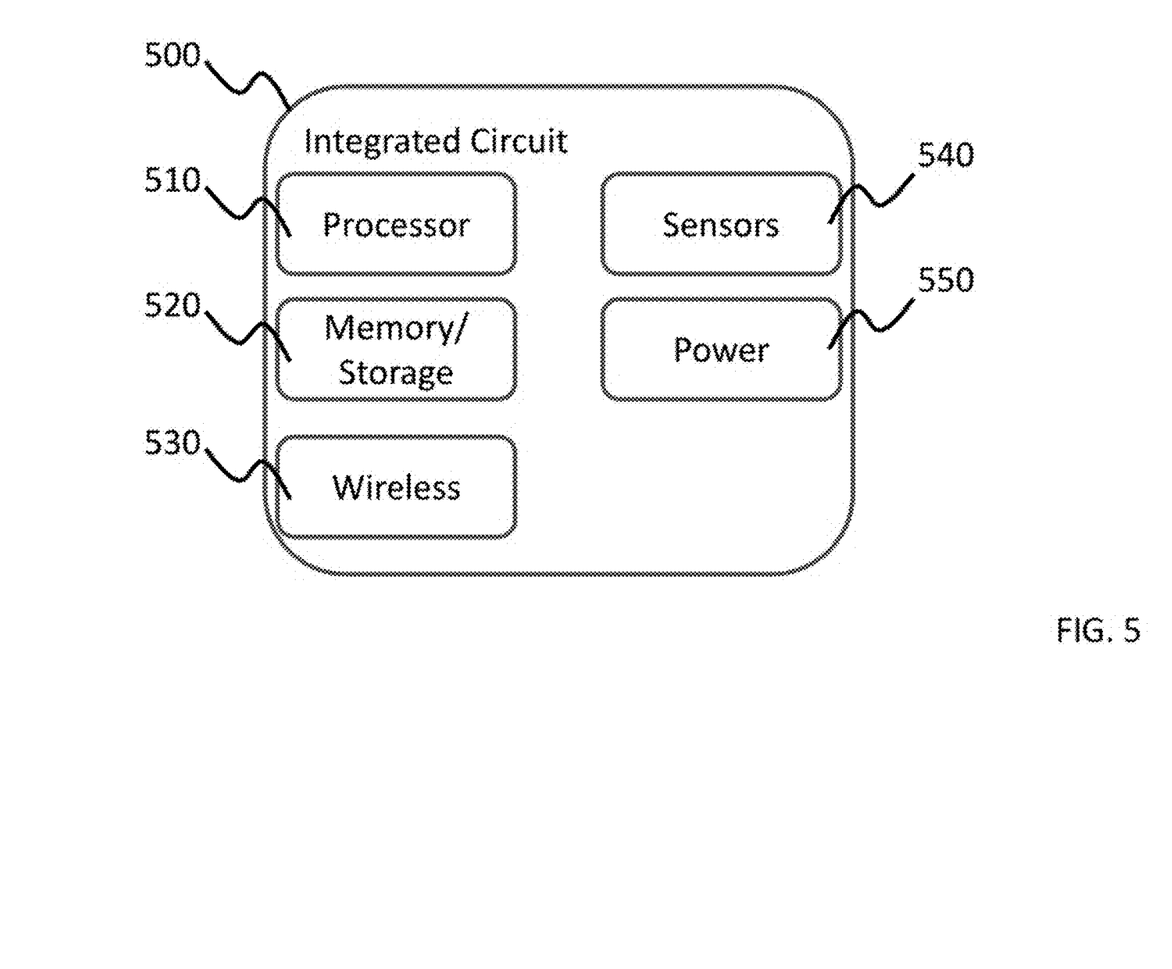
FIG. 5 depicts a block diagram of a hydration tracking circuit in accordance with various embodiments of the invention.

Referring to FIG. 5, in various embodiments, the two-part lid may have integrated hydration tracking. For example, the two-part lid may be configured to periodically measure the amount of liquid inside the storage container. The measured liquid amounts may then be used by a companion electronic device (e.g. a computer or smartphone operating an application) to help track a user's hydration. For example, the two-part lid may include a liquid measuring circuit 500 for measuring the amount of liquid in the storage container. In various embodiments, the liquid measuring circuit 500 includes a processor 510, a memory/persistent storage 520, wireless communications 530, sensors 540, and a power source 550. In various embodiments, one or more of the components 510-550 may be integrated onto a single chip or integrated circuit. In various embodiments, the processor 510 executes one or more instructions from the memory 520 that cause allows for data to be processed from the sensors 540, stored in the memory 520, and occasionally transferred to another computing device using the wireless communications 530. The sensors 540 may be configured to measure a liquid level in the insulated container. For example, the sensors 540 may include an optical sensor configured to measure distance. In various embodiments, the sensors 540 may also include one or more motion sensors (e.g. accelerometers) configured to measure the movement of one or both parts of the two-part lid. For example, an accelerometer may detect that the upper portion of the two part lid has been removed and that the bottle has moved. This action may be indicative of a user taking a drink from the container and thus trigger the measurement of the current liquid level. In other embodiments, the liquid measuring circuit 500 may be configured to take regular measurements of the liquid present in the insulated container. In other embodiments, the liquid measuring circuit 500 may take regular measurements and additional measurements based on sensor data. For example, an accelerometer may be used to detect that the two-part lid was completely removed. Removal of the lid may be indicative of the user refilling the container. Thus, an additional measurement may be made once the lid is replaced back on the bottle.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A liquid storage container comprising:
a two-part lid having an upper portion removably connected to a lower portion, wherein the lower portion comprises a cavity having an inlet and a spout, wherein the two-part lid may be removably coupled to the body, wherein the body defines a storage cavity and comprises:
a double-walled vacuum insulated layer defining the storage cavity;
a membrane formed on an outside of the double-walled vacuum insulated layer; and
a coating formed on an outside of the membrane.

2. The liquid storage container of claim 1, wherein the membrane comprises a polycarbonate.

3. The liquid storage container of claim 1, wherein the membrane comprises at least one of a polypropylene (PP), polystyrene (PS), high impact polystyrene (HIPS), acrylonitrile butadiene styrene (ABS), polyethylene terephthalate (PET or PETE), polyester (PES), polyamides (PA) (Nylons), poly (vinyl chloride) (PVC), polyurethanes (PU), polyethylene (PE), polylactic acid (PLA), perylic (PMMA), or acetal (Polyoxymethlene, POM).

4. The liquid storage container of claim 1, wherein the coating comprises an aromatic polyurethane-based coating.

5. The liquid storage container of claim 1, wherein the coating comprises at least one of a hardide-based coating, a thermoplastic elastomer (TPE)-based coating, a silicone-based coating, a rubber-based coating, a cerakote-based coating, or a D3O-based coating.

6. The liquid storage container of claim 1, wherein the upper portion is removably connected to a lower portion by a half-turn of the upper portion relative to the lower portion.

7. The liquid storage container of claim 1, wherein the inlet defines a half-circle shaped passage between the storage cavity and the cavity, wherein the cavity is defined by:
an upper cavity surface that extends from a flat side of the inlet to a spout, wherein the upper cavity surface comprises a parabolic shape that curves around a center of the first cavity; and
a lower cavity surface that extends from the curved side of the spout, wherein the lower cavity surface comprises a multi-curved shape having a curved shape with a decreasing slope and then an increasing slope until the slope becomes substantially vertical near the spout.

8. The liquid storage container of claim 1, wherein the lid comprises a liquid measuring circuit.

9. The liquid storage container of claim 8, wherein the liquid measuring circuit comprises an optical sensor configured to measure a distance from a bottom of the lid to a surface of a liquid in the storage cavity.

10. A liquid storage container comprising:
a two-part lid, comprising an upper portion that is removably coupled to a lower portion, wherein the lower portion is removably coupled to a body, wherein the body comprises:
a storage cavity defined by a double-walled vacuum insulated layer;
a polycarbonate membrane formed on an outside of the double-walled vacuum insulated layer; and
an aromatic polyurethane-based coating formed on an outside of the membrane.

11. The liquid storage container of claim 10, wherein the lower portion comprises a liquid measuring circuit.

12. A liquid storage container comprising:
a lid removably coupled to the body, wherein the body defines a storage cavity and comprises:
a double-walled vacuum insulated layer defining the storage cavity;
a membrane formed on an outside of the double-walled vacuum insulated layer; and
a coating formed on an outside of the membrane;
wherein the lid comprises a liquid measuring circuit.

13. The liquid storage container of claim 12, wherein the membrane comprises a polycarbonate.

14. The liquid storage container of claim 12, wherein the membrane comprises at least one of a polypropylene (PP), polystyrene (PS), high impact polystyrene (HIPS), acrylonitrile butadiene styrene (ABS), polyethylene terephthalate (PET or PETE), polyester (PES), polyamides (PA) (Nylons), poly (vinyl chloride) (PVC), polyurethanes (PU), polyethylene (PE), polylactic acid (PLA), perylic (PMMA), or acetal (Polyoxymethlene, POM).

15. The liquid storage container of claim 12, wherein the coating comprises an aromatic polyurethane-based coating.

16. The liquid storage container of claim 12, wherein the coating comprises at least one of a hardide-based coating, a thermoplastic elastomer (TPE)-based coating, a silicone-based coating, a rubber-based coating, a cerakote-based coating, or a D3O-based coating.

17. The liquid storage container of claim 12, wherein the lid comprises a two-part lid having an upper portion removably connected to a lower portion.

18. The liquid storage container of claim 17, wherein the lower portion comprises a cavity having an inlet and a spout.

19. The liquid storage container of claim 18, wherein the inlet defines a half-circle shaped passage between the storage cavity and the cavity, wherein the cavity is defined by:

an upper cavity surface that extends from a flat side of the inlet to a spout, wherein the upper cavity surface comprises a parabolic shape that curves around a center of the first cavity; and a lower cavity surface that extends from the curved side of the spout, wherein the lower cavity surface comprises a multi-curved shape having a curved shape with a decreasing slope and then an increasing slope until the slope becomes substantially vertical near the spout.

* * * * *